United States Patent
Burroughs et al.

(10) Patent No.: US 12,104,812 B2
(45) Date of Patent: Oct. 1, 2024

(54) VARIABLE REFRIGERANT FLOW SYSTEM WITH ZONE GROUPING CONTROL FEASIBILITY ESTIMATION

(71) Applicant: Johnson Controls Technology Company, Auburn Hills, MI (US)

(72) Inventors: John H. Burroughs, Wauwatosa, WI (US); Andrew J. Przybylski, Franksville, WI (US); Matthew J. Ellis, Milwaukee, WI (US); Mohammad N. Elbsat, Milwaukee, WI (US); Michael J. Wenzel, Grafton, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 818 days.

(21) Appl. No.: 16/512,712

(22) Filed: Jul. 16, 2019

(65) Prior Publication Data
US 2021/0018204 A1    Jan. 21, 2021

(51) Int. Cl.
*F24F 11/47* (2018.01)
*F24F 11/54* (2018.01)
(Continued)

(52) U.S. Cl.
CPC .............. *F24F 11/47* (2018.01); *F24F 11/54* (2018.01); *F24F 11/56* (2018.01); *F24F 11/64* (2018.01);
(Continued)

(58) Field of Classification Search
CPC .. F24F 11/47; F24F 11/54; F24F 11/56; F24F 11/64; F24F 11/65; F24F 11/83;
(Continued)

(56) References Cited

U.S. PATENT DOCUMENTS 9,235,657 B1    1/2016  Wenzel et al.
2014/0379141 A1*  12/2014  Patil .................. F24F 11/50
                                                    700/277
(Continued)

FOREIGN PATENT DOCUMENTS

JP      H 09-105545 A    4/1997
JP      2010-025497 A    2/2010
(Continued)

OTHER PUBLICATIONS

U.S. Appl. No. 15/920,077, filed Mar. 13, 2018, Ingale et al.
(Continued)

*Primary Examiner* — Paul B Yanchus, III
(74) *Attorney, Agent, or Firm* — Foley & Lardner LLP (57) ABSTRACT

One implementation of the present disclosure is a controller for a variable refrigerant flow system. The controller includes processors and memory storing instructions that, when executed by the processors, cause the processors to perform operations including identifying zones within a structure, generating zone groupings defining zone groups and specifying which of the zones are grouped together to form each of the zone groups, generating metric of success values corresponding to the zone groupings and indicating a control feasibility of a corresponding zone grouping, selecting a zone grouping based on the metric of success values, and using the selected zone grouping to operate equipment of the variable refrigerant flow system to provide heating or cooling to the zones.

20 Claims, 7 Drawing Sheets

(51) Int. Cl.
  *F24F 11/56*   (2018.01)
  *F24F 11/64*   (2018.01)
  *F24F 11/65*   (2018.01)
  *F24F 11/83*   (2018.01)
  *G05B 19/042*  (2006.01)
  *F24F 110/10*  (2018.01)
  *F24F 110/12*  (2018.01)
  *F24F 140/50*  (2018.01)
  *F24F 140/60*  (2018.01)

(52) U.S. Cl.
  CPC .............. *F24F 11/65* (2018.01); *F24F 11/83* (2018.01); *G05B 19/042* (2013.01); *F24F 2110/10* (2018.01); *F24F 2110/12* (2018.01); *F24F 2140/50* (2018.01); *F24F 2140/60* (2018.01); *G05B 2219/2614* (2013.01)

(58) Field of Classification Search
  CPC .............. F24F 2110/10; F24F 2110/12; F24F 2140/50; F24F 2140/60; G05B 19/042; G05B 2219/2614
  See application file for complete search history.

(56) References Cited

U.S. PATENT DOCUMENTS

| | | | |
|---|---|---|---|
| 2018/0004173 A1* | 1/2018 | Patel | G05B 13/048 |
| 2018/0285800 A1 | 10/2018 | Wenzel et al. | |
| 2019/0033803 A1 | 1/2019 | Chatterjee et al. | |
| 2019/0377306 A1* | 12/2019 | Harvey | G05B 13/027 |

FOREIGN PATENT DOCUMENTS

| | | |
|---|---|---|
| JP | 2011-069577 A | 4/2011 |
| JP | 2016-031220 A | 3/2016 |
| JP | 6073001 B2 | 2/2017 |
| WO | WO-2013/145810 | 10/2013 |
| WO | WO-2018/005760 A1 | 1/2018 |

OTHER PUBLICATIONS

Office Action on JP 2020-120687, dated Aug. 17, 2021, 10 pages with English language translation.

JP Office Action on JP Appl. Ser. No. 2020-120687 dated Mar. 22, 2022, with translation (6 pages).

* cited by examiner

VARIABLE REFRIGERANT FLOW SYSTEM WITH ZONE GROUPING CONTROL FEASIBILITY ESTIMATION

BACKGROUND

The present disclosure relates generally to variable refrigerant flow (VRF) systems. A VRF system typically includes one or more outdoor VRF units that consume electrical power to heat and/or cool a refrigerant. VRF systems also typically include multiple indoor VRF units located in various spaces of a building, each of which receives the refrigerant from the outdoor VRF unit(s) and uses the refrigerant to transfer heat into or out of a particular space.

SUMMARY

One implementation of the present disclosure is a controller for a variable refrigerant flow system. The controller includes processors and memory storing instructions that, when executed by the processors, cause the processors to perform operations including identifying zones within a structure, generating zone groupings defining zone groups and specifying which of the zones are grouped together to form each of the zone groups, generating metric of success values corresponding to the zone groupings and indicating a control feasibility of a corresponding zone grouping, selecting a zone grouping based on the metric of success values, and using the selected zone grouping to operate equipment of the variable refrigerant flow system to provide heating or cooling to the zones.

In some embodiments, the processors analyze data associated with the zone groupings including at least one of historical zone temperature set points of the zones in the zone groupings, historical zone operating modes of the zones in the zone groupings, and zone locations of the zones in the zone groupings.

In some embodiments, the zones include devices to control an environment of the zones in the selected zone grouping.

In some embodiments, the controller includes a system identification module that generates a system model based on the output including the selected zone grouping.

In some embodiments, the operations further comprising generating one zone grouping that is the particular zone grouping defining a plurality of zone groups and specifying which of the plurality of zones are grouped together to form each of the plurality of zone groups.

In some embodiments, generating metric of success values involves selecting outlier detection techniques to identify outlying zones in a zone group and calculating the metric of success value using the outlying zones and a total number of zones included in the particular zone grouping.

In some embodiments, generating metric of success values involves calculating estimated heat disturbance loads based on an outdoor air temperature and an outdoor air relative humidity value and calculating variances in the estimated heat disturbance loads.

In some embodiments, generating metric of success values involves calculating an operating cost value associated with combinations of zone groupings based on the data associated with the devices that control an environment of the zones.

Another implementation of the present disclosure is a controller for a variable refrigerant flow system that operates equipment of the variable refrigerant flow system. The controller includes a zone identifier that identifies zones within a structure, a zone grouping generator module that generates zone groupings that define zone groups and specify which of the zones identified by the zone identifier are grouped together to form each of the zone groups, a metric of success calculator that generates metric of success values corresponding to the zone groupings generated by the zone grouping generator module and indicating a control feasibility of a corresponding zone grouping, a metric of success comparator that determines a selected zone grouping based on the metric of success values generated by the metric of success calculator, and a control signal generator that uses the selected zone grouping to generate control signals to operate equipment of the variable refrigerant flow system to provide heating or cooling to the zones.

In some embodiments, the zones include devices that control an environment of the zones of the selected zone grouping.

In some embodiments, the controller includes a system identification module that generates system models based on the output including the selected zone grouping.

In some embodiments, the metric of success value calculator performs an outlier detection technique to identify outlying zones in a zone group and calculates the metric of success value using the outlying zones and a total number of zones included in the particular zone grouping.

In some embodiments, the metric of success value calculator calculates estimated heat disturbance loads based on an outdoor air temperature and an outdoor air relative humidity value and calculates variances in the estimated heat disturbance loads.

In some embodiments, the metric of success calculator calculates an operating cost value associated with the of zone groupings based on data associated with the devices that control the environment of the zones.

Yet another implementation of the present disclosure is a method for operating equipment of a variable refrigerant flow system to provide heating or cooling to a plurality of zones. The method involves identifying zones within a structure, generating zone groupings that define zone groups and specifying which zones are grouped together to form each zone group, generating metric of success values corresponding to the zone grouping and indicating a control feasibility of a corresponding zone grouping, selecting a zone grouping based on the metric of success values, and using the selected zone grouping to generate control signals that operate equipment of the variable refrigerant flow system to provide heating or cooling to the zones.

In some embodiments, using the selected zone grouping to generate control signals involves performing system identification to generate system models based on the selected zone grouping.

In some embodiments, the method involves generating one zone grouping that is the particular zone grouping defining a plurality of zone groups and specifying which of the plurality of zones are grouped together to form each of the plurality of zone groups.

In some embodiments, generating metric of success value involves selecting outlier detection techniques to identify outlying zones in a zone group and calculating the metric of success value using the outlying zones and a total number of zones included in the particular zone grouping.

In some embodiments, generating metric of success value involves calculating estimated heat disturbance loads based on an outdoor air temperature and an outdoor air relative humidity value and calculating variances in the estimated heat disturbance loads.

In some embodiments, generating metric of success values involves calculating an operating cost value of the zone groupings based on data associated with devices that control environments of the zones.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a variable refrigerant flow (VRF) system and components thereof are shown, according to some embodiments. The VRF system includes a VRF controller configured to operate equipment included in the VRF system, according to some embodiments. The VRF controller is configured to operate equipment included in the VRF system using control signals to provide heating and/or cooling loads to various spaces included in a structure, according to some embodiments. In order to simplify the control algorithm used by the VRF controller, the various spaces included in the structure may be grouped together to form one or more zone groups, according to some embodiments. When generating one or more zone groups, a user may be unaware of the probability of success relative to the operation of each zone group.

In order to assist with the generation of one or more zone groups, the VRF controller is configured to identify each zone included in the structure, generate various zone grouping combinations, analyze data associated with each zone in each zone grouping, calculate one or more metric of success values for each zone grouping based on the analyzed data, and output one or more selected zone groupings based on the highest metric of success value, according to some embodiments. Each metric of success value calculated for a particular zone grouping represents a control feasibility of the particular zone grouping to be controlled using a system model generated for the particular zone grouping. In instances in which a greatest metric of success value is calculated for a particular zone grouping (relative the metric of success values calculated for one or more other zone groupings), the greatest metric of success value may indicate that the particular zone grouping represents the most feasible control option compared to the one or more other zone groupings. More specifically, the most feasible control option may represent a particular zone grouping with an environment which building equipment can most accurately control using a model generated for the particular zone grouping. For example, a first metric of success value is calculated to be a value of 0.95 for a first zone grouping and a second metric of success value is calculated to be a value of 0.80 for a second zone grouping. Based on the first metric of success value being the greatest value of the first and second metric of success values, the first metric of success value may indicate that the first zone grouping is a more feasible control option. Advantageously, the VRF controller assists a user with the commissioning of a VRF system by reducing the number of zone grouping iterations performed by the user by generating various combinations of zone groupings, calculating a metric of success value for each zone grouping, and determining, based on the greatest metric of success value, a particular zone grouping with the greatest control feasibility.

Variable Refrigerant Flow Systems

Figure 1A:
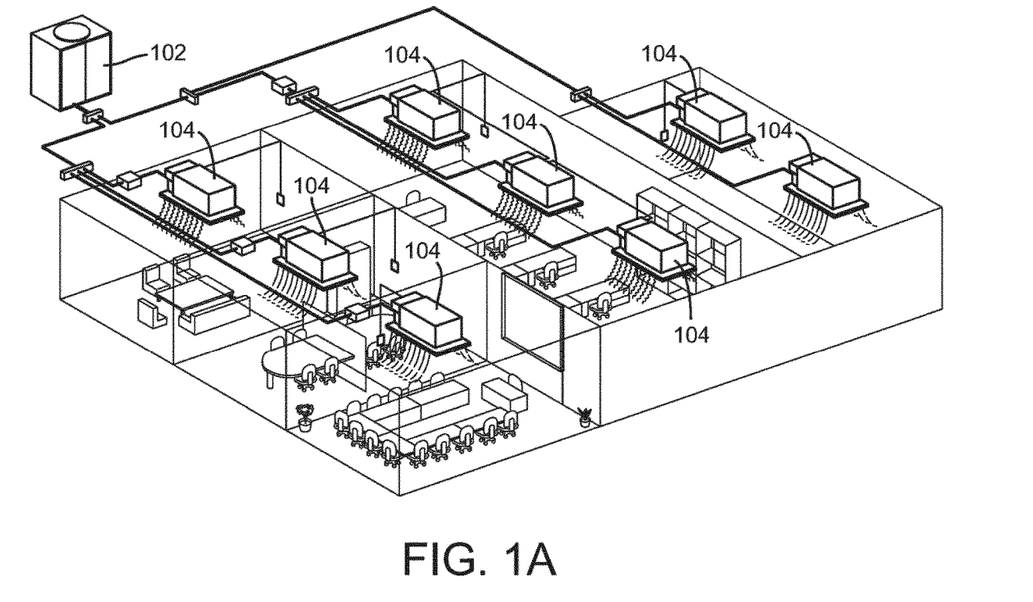
FIG. 1A is a first illustration of a variable refrigerant flow system for a building, according to an exemplary embodiment.
Figure 1B:
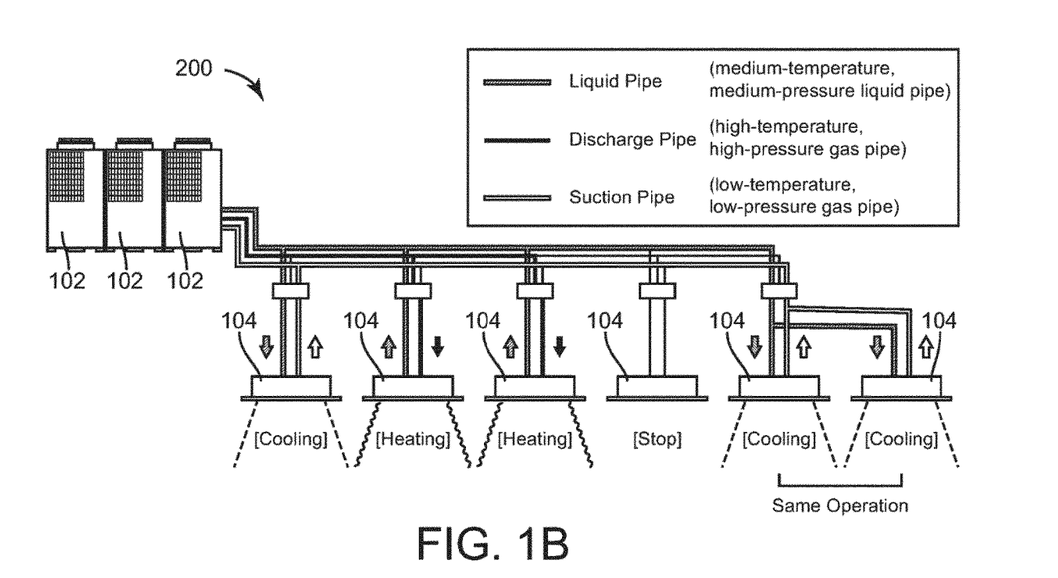
FIG. 1B is a second illustration of a variable refrigerant flow system for a building, according to an exemplary embodiment.

Referring now to FIGS. 1A-B, a variable refrigerant flow (VRF) system 100 is shown, according to some embodiments. VRF system 100 is shown to include one or more outdoor VRF units 102 and a plurality of indoor VRF units 104. Outdoor VRF units 102 can be located outside a building and can operate to heat or cool a refrigerant. Outdoor VRF units 102 can consume electricity to convert refrigerant between liquid, gas, and/or super-heated gas phases. Indoor VRF units 104 can be distributed throughout various building zones within a building and can receive the heated or cooled refrigerant from outdoor VRF units 102. Each indoor VRF unit 104 can provide temperature control for the particular building zone in which the indoor VRF unit 104 is located. Although the term "indoor" is used to denote that the indoor VRF units 104 are typically located inside of buildings, in some cases one or more indoor VRF units are located "outdoors" (i.e., outside of a building) for example to heat/cool a patio, entryway, walkway, etc.

One advantage of VRF system 100 is that some indoor VRF units 104 can operate in a cooling mode while other indoor VRF units 104 operate in a heating mode. For example, each of outdoor VRF units 102 and indoor VRF units 104 can operate in a heating mode, a cooling mode, or an off mode. Each building zone can be controlled independently and can have different temperature setpoints. In some embodiments, each building has up to three outdoor VRF units 102 located outside the building (e.g., on a rooftop) and up to 128 indoor VRF units 104 distributed throughout the building (e.g., in various building zones). Building zones may include, among other possibilities, apartment units, offices, retail spaces, and common areas. In some cases, various building zones are owned, leased, or otherwise occupied by a variety of tenants, all served by the VRF system 100.

Many different configurations exist for VRF system 100. In some embodiments, VRF system 100 is a two-pipe system in which each outdoor VRF unit 102 connects to a single refrigerant return line and a single refrigerant outlet line. In a two-pipe system, all of outdoor VRF units 102 may operate in the same mode since only one of a heated or chilled refrigerant can be provided via the single refrigerant outlet line. In other embodiments, VRF system 100 is a three-pipe system in which each outdoor VRF unit 102 connects to a refrigerant return line, a hot refrigerant outlet line, and a cold refrigerant outlet line. In a three-pipe system, both heating and cooling can be provided simultaneously via the dual refrigerant outlet lines. An example of a three-pipe VRF system is described in detail with reference to FIG. 2.

Figure 2:
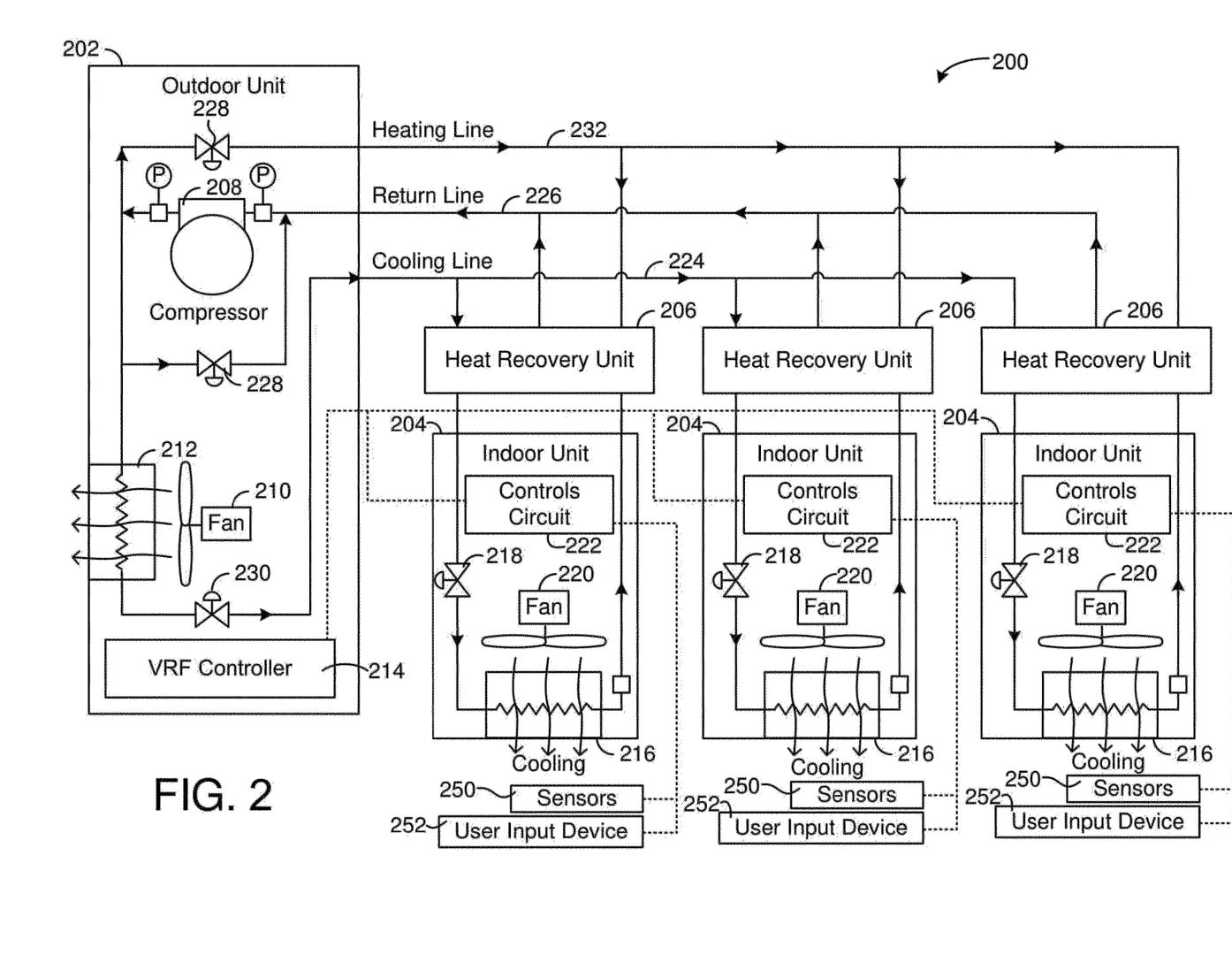
FIG. 2 is a detailed diagram of a variable refrigerant flow system for a building, according to an exemplary embodiment.

Referring now to FIG. 2, a block diagram illustrating a VRF system 200 is shown, according to an exemplary embodiment. VRF system 200 is shown to include outdoor VRF unit 202, several heat recovery units 206, and several indoor VRF units 204. Although FIG. 2 shows one outdoor VRF unit 202, embodiments including multiple outdoor VRF units 202 are also within the scope of the present disclosure. Outdoor VRF unit 202 may include a compressor 208, a fan 210, or other power-consuming refrigeration components configured convert a refrigerant between liquid, gas, and/or super-heated gas phases. Indoor VRF units 204 can be distributed throughout various building zones within a building and can receive the heated or cooled refrigerant from outdoor VRF unit 202. Each indoor VRF unit 204 can provide temperature control for the particular building zone in which the indoor VRF unit 204 is located. Heat recovery units 206 can control the flow of a refrigerant between outdoor VRF unit 202 and indoor VRF units 204 (e.g., by opening or closing valves) and can minimize the heating or cooling load to be served by outdoor VRF unit 202.

Outdoor VRF unit 202 is shown to include a compressor 208 and a heat exchanger 212. Compressor 208 circulates a refrigerant between heat exchanger 212 and indoor VRF units 204. The compressor 208 operates at a variable frequency as controlled by VRF Controller 214. At higher frequencies, the compressor 208 provides the indoor VRF units 204 with greater heat transfer capacity. Electrical power consumption of compressor 208 increases proportionally with compressor frequency.

Heat exchanger 212 can function as a condenser (allowing the refrigerant to reject heat to the outside air) when VRF system 200 operates in a cooling mode or as an evaporator (allowing the refrigerant to absorb heat from the outside air) when VRF system 200 operates in a heating mode. Fan 210 provides airflow through heat exchanger 212. The speed of fan 210 can be adjusted (e.g., by VRF Controller 214) to modulate the rate of heat transfer into or out of the refrigerant in heat exchanger 212.

Each indoor VRF unit 204 is shown to include a heat exchanger 216 and an expansion valve 218. Each of heat exchangers 216 can function as a condenser (allowing the refrigerant to reject heat to the air within the room or zone) when the indoor VRF unit 204 operates in a heating mode or as an evaporator (allowing the refrigerant to absorb heat from the air within the room or zone) when the indoor VRF unit 204 operates in a cooling mode. Fans 220 provide airflow through heat exchangers 216. The speeds of fans 220 can be adjusted (e.g., by indoor unit controls circuits 222) to modulate the rate of heat transfer into or out of the refrigerant in heat exchangers 216.

In FIG. 2, indoor VRF units 204 are shown operating in the cooling mode. In the cooling mode, the refrigerant is provided to indoor VRF units 204 via cooling line 224. The refrigerant is expanded by expansion valves 218 to a cold, low pressure state and flows through heat exchangers 216 (functioning as evaporators) to absorb heat from the room or zone within the building. The heated refrigerant then flows back to outdoor VRF unit 202 via return line 226 and is compressed by compressor 208 to a hot, high pressure state. The compressed refrigerant flows through heat exchanger 212 (functioning as a condenser) and rejects heat to the outside air. The cooled refrigerant can then be provided back to indoor VRF units 204 via cooling line 224. In the cooling mode, flow control valves 228 can be closed and expansion valve 230 can be completely open.

In the heating mode, the refrigerant is provided to indoor VRF units 204 in a hot state via heating line 232. The hot refrigerant flows through heat exchangers 216 (functioning as condensers) and rejects heat to the air within the room or zone of the building. The refrigerant then flows back to outdoor VRF unit via cooling line 224 (opposite the flow direction shown in FIG. 2). The refrigerant can be expanded by expansion valve 230 to a colder, lower pressure state. The expanded refrigerant flows through heat exchanger 212 (functioning as an evaporator) and absorbs heat from the outside air. The heated refrigerant can be compressed by compressor 208 and provided back to indoor VRF units 204 via heating line 232 in a hot, compressed state. In the heating mode, flow control valves 228 can be completely open to allow the refrigerant from compressor 208 to flow into heating line 232.

As shown in FIG. 2, each indoor VRF unit 204 includes an indoor unit controls circuit 222. Indoor unit controls circuit 222 controls the operation of components of the indoor VRF unit 204, including the fan 220 and the expansion valve 218, in response to a building zone temperature setpoint or other request to provide heating/cooling to the building zone. The indoor unit controls circuit 222 may also determine a heat transfer capacity required by the indoor VRF unit 204 and transmit a request to the outdoor VRF unit 202 requesting that the outdoor VRF unit 202 operate at a corresponding capacity to provide heated/cooled refrigerant to the indoor VRF unit 204 to allow the indoor VRF unit 204 to provide a desired level of heating/cooling to the building zone.

Each indoor unit controls circuit 222 is shown as communicably coupled to one or more sensors 250 and a user input device 252. In some embodiments, the one or more sensors 250 may include a temperature sensor (e.g., measuring indoor air temperature), a humidity sensor, and/or a sensor measuring some other environmental condition of a building zone served by the indoor VRF unit 204. In some embodiments, the one or more sensors include an occupancy detector configured to detect the presence of one or more people in the building zone and provide an indication of the occupancy of the building zone to the indoor unit controls circuit 222.

Each user input device 252 may be located in the building zone served by a corresponding indoor unit 204. The user input device 252 allows a user to input a request to the VRF system 200 for heating or cooling for the building zone and/or a request for the VRF system 200 to stop heating/cooling the building zone. According to various embodiments, the user input device 252 may include a switch, button, set of buttons, thermostat, touchscreen display, etc. The user input device 252 thereby allows a user to control the VRF system 200 to receive heating/cooling when desired by the user.

The indoor unit controls circuit 222 may thereby receive an indication of the occupancy of a building zone (e.g., from an occupancy detector of sensors 250 and/or an input of a user via user input device 252). In response, the indoor unit controls circuit 222 may generate a new request for the outdoor VRF unit 202 to operate at a requested operating capacity to provide refrigerant to the indoor unit 204. The indoor unit controls circuit 222 may also receive an indication that the building zone is unoccupied and, in response, generate a signal instructing the outdoor VRF unit 202 to stop operating at the requested capacity. The indoor unit controls circuit 222 may also control various components of the indoor unit 204, for example by generating a signal to turn the fan 220 on and off.

The outdoor unit controls circuit 214 may receive heating/cooling capacity requests from one or more indoor unit controls circuits 222 and aggregate the requests to determine a total requested operating capacity. Accordingly, the total requested operating capacity may be influenced by the occupancy of each of the various building zones served by various indoor units 204. In many cases, a when a person or people first enter a building zone and a heating/cooling request for that zone is triggered, the total requested operating capacity may increase significantly, for example reaching a maximum operating capacity. Thus, the total request operating capacity may vary irregularly and unpredictably as a result of the sporadic occupation of various building zones.

The outdoor unit controls circuit 214 is configured to control the compressor 208 and various other elements of the outdoor unit 202 to operate at an operating capacity based at least in part on the total requested operating capacity. At higher operating capacities, the outdoor unit 202 consumes more power, which increases utility costs. In some embodiments, the VRF controller may be capable of For an operator, owner, lessee, etc. of a VRF system, it may be desirable to minimize power consumption and utility costs to save money, improve environmental sustainability, reduce wear-and-tear on equipment, etc. In some cases, multiple entities or people benefit from reduced utility costs, for example according to various cost apportionment schemes for VRF systems described in U.S. patent application Ser. No. 15/920,077 filed Mar. 13, 2018, incorporated by reference herein in its entirety. Thus, as described in detail below, the controls circuit 214 may be configured to manage the operating capacity of the outdoor VRF unit 202 to reduce utility costs while also providing comfort to building occupants. Accordingly, in some embodiments, the controls circuit 214 may be operable in concert with systems and methods described in P.C.T. Patent Application No. PCT/US2017/039,937 filed Jun. 29, 2017, and/or U.S. patent application Ser. No. 15/635,754 filed Jun. 28, 2017, both of which are incorporated by reference herein in their entireties.

Zone Grouping Metric of Success

Referring generally to FIGS. 3-8, systems and methods for generating zone groupings, calculating a metric of success value for each generated zone grouping, determining, based on the metric of success value calculated for each zone grouping, one or more zone groupings with a greatest control feasibility, and using the a particular one of the one or more zone groupings to control equipment in a building control system are shown according to some embodiments. The systems and methods of FIGS. 3-8 can be implemented using or as part of a building management system or HVAC system, for example, VRF system 100 of FIG. 1A, according to some embodiments. For ease and clarity of explanation, the following description of FIGS. 3-8 make reference to elements of VRF system 100. However, it should be noted that various embodiments of the present disclosure may be implemented in a variety of HVAC systems, BMS, and combinations thereof and are not limited to VRF systems.

Figure 3:
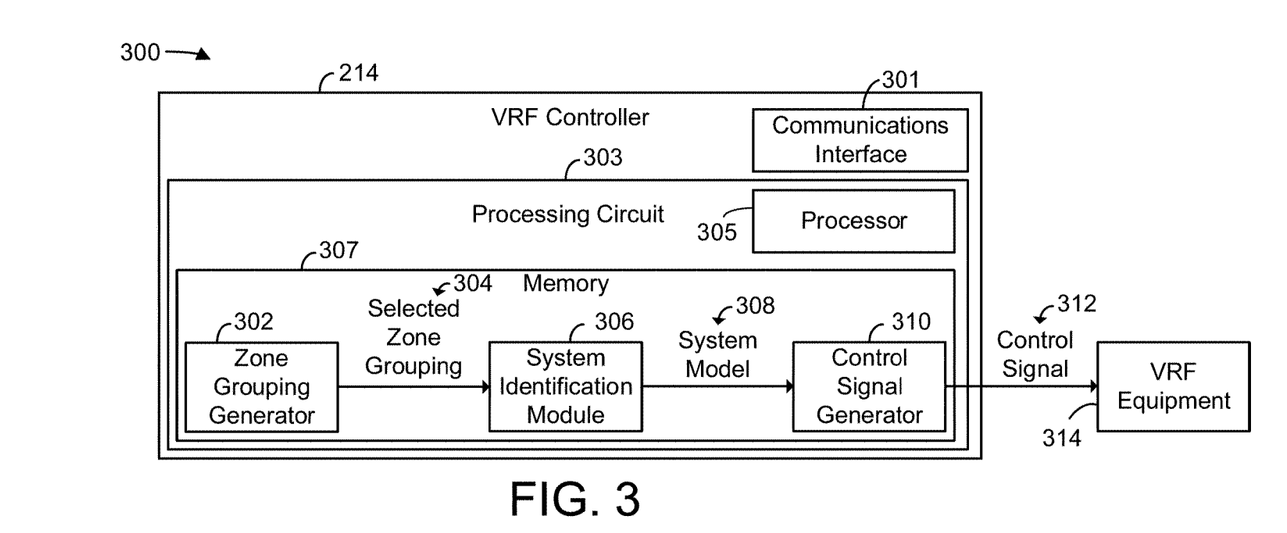
FIG. 3 is a block diagram of a VRF controller implemented with the variable refrigerant flow system of FIG. 2, according to an exemplary embodiment.

Referring now to FIG. 3, a detailed block diagram 300 of VRF controller 214 is shown, according to some embodiments. VRF controller 214 is shown to include a communications interface 301 and a processing circuit 303 having a processor 305 and memory 307, according to some embodiments. In some embodiments, communications interface 301 facilitates communications between VRF controller 214 and devices included in VRF system 200 (e.g., compressor 208, indoor units 204, etc.) for allowing user control, monitoring, and adjustment to devices included in VRF system 100.

Communications interface 301 can be or include wired or wireless communications interfaces (e.g., jacks, antennas, transmitters, receivers, transceivers, wire terminals, etc.) for conducting data communications with devices included in VRF system 200 or other external systems or devices, according to some embodiments. In some embodiments, communications via communications interface 301 can be direct (e.g., local wired or wireless communications) or via a communications network (e.g., a WAN, the Internet, a cellular network, etc.). For example, communications interface 301 can include an Ethernet card and port for sending and receiving data via an Ethernet-based communications link or network. In another example, communications interface 301 can include a Wi-Fi transceiver for communicating via a wireless communications network. In yet another example, communications interface 301 can include cellular or mobile phone communications transceivers.

Still referring to FIG. 3, processing circuit 303 can be communicably connected to communications interface 301 such that processing circuit 303 and the various components thereof can send and receive data via communications interface 301, according to some embodiments. Processor 305 can be implemented as a general purpose processor, an application specific integrated circuit (ASIC), one or more field programmable gate arrays (FPGAs), a group of processing components, or other suitable electronic processing components, according to some embodiments.

Memory 307 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application, according to some embodiments. In some embodiments, memory 307 can be or include volatile memory or non-volatile memory. Memory 307 can include database components, object code components, script components, or any other type of information structure for supporting the various activities and information structures described in the present application, according to some embodiments. According to some embodiments, memory 307 is communicably connected to processor 305 via processing circuit 303 and includes computer code for executing (e.g., by processing circuit 303 and/or processor 305) one or more processes described herein.

Still referring to FIG. 3, memory 307 is shown to include zone grouping generator 302, system identification module 306, and control signal generator 310, according to some embodiments. In some embodiments, zone grouping generator 302 is configured to generate a plurality of potential zone groupings, score or rank each of the potential zone groupings, and provide an output of a selected zone grouping 304. Each selected zone grouping indicates a different way in which a plurality of building zones can be grouped for purposes of system identification and building control, according to some embodiments. In some embodiments, all of the building zones within a single zone group are treated as a single unit when generating a system model and control signals. For example, a different system model may be generated for each zone group (using data from all of the zones in that zone group) and the system model for a zone group may be used to generate control signals for all of the zones in that zone group. The functionality and methods of zone grouping generator 302 will be described in greater detail below. Zone grouping generator 302 can be configured to output selected zone grouping 304 to system identification module 306, according to some embodiments. In some embodiments, selected zone grouping 304 includes one or more zone groupings. In other embodiments, selected zone grouping 304 includes individual zones identified as a best zone grouping.

As shown in FIG. 3, selected zone grouping 304 is transmitted as an input to system identification module 306, according to some embodiments. System identification module 306 is configured to perform a system identification process to generate a model of the system, according to some embodiments. Possible system identification processes which can be performed by system identification module 306 are described in U.S. Pat. No. 9,235,657 granted Jan. 12, 2016, incorporated by reference herein its entirety. In general, system identification is a process of identifying unspecified system parameters in a model of the building, for example by minimizing prediction errors. In some embodiments, system identification module 306 can be configured to perform a system identification process for each of the zone groups in selected zone grouping 304 generated by zone grouping generator 302.

Each system identification process generates a system model 308 for a particular zone group using the input data and output data associated with all of the building zones in that zone group, according to some embodiments. For example, system identification module 306 may use selected zone grouping 304 to identify all of the building zones within a first zone group of selected zone grouping 304. In some embodiments, system identification module 306 obtains training data (e.g., input data and output data) associated with the building zones in the first group and uses the training data to train a system model for the first zone group. System identification module 306 repeats this process for each of the zone groups in selected zone grouping 304 to generate a different system model for each zone group, according to some embodiments. According to some embodiments, system identification module 306 provides each identified system model 308 to control signal generator 310.

Control signal generator 310 is shown to receive system model 308 from system identification module 306, according to some embodiment. In some embodiments, control signal generator 310 uses system models 308 to generate appropriate control signals for VRF equipment 314 that operate to control an environment of one or more zone groups. In some embodiments, each system model 308 corresponds to a particular zone group defined by selected zone grouping 304 generated by zone grouping generator 302 and is used to generate control signals for the corresponding zone group. In some embodiments, control signal generator 310 uses any of a variety of model-based control methodologies (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to generate a control signal 312. Control signal generator 310 is shown to output control signal 312 to VRF equipment 314, according to some embodiments. In some embodiments, control signal 312 includes commands to operate VRF equipment 314.

Zone Grouping Generator

Figure 4:
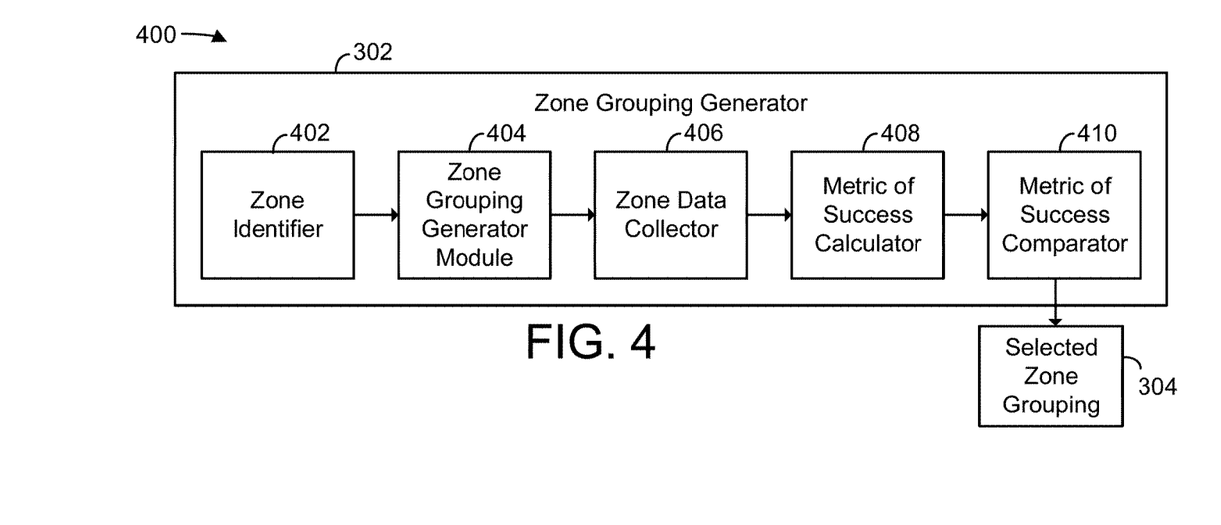
FIG. 4 is a block diagram of a zone grouping generator implemented with the VRF controller of FIG. 3, according to an exemplary embodiment.

Referring now to FIG. 4, a block diagram 400 illustrating zone grouping generator 302 in greater detail is shown, according to some embodiments. Zone grouping generator 302 is shown to include a zone identifier 402, a zone grouping generator module 404, a zone data collector 406, a metric of success calculator 408, and a metric of success comparator 410 to determine selected zone grouping 304 as an output, according to some embodiments.

As shown in FIG. 4, zone identifier 402 is configured to identify the types of zones in a building, according to some embodiments. For example, zone identifier 402 may be tasked with identifying the types of zones in a building that functions as a school. The types of zones in a school may include classrooms, laboratories, restrooms, and hallways. Additional types of zones may be identified and are not limited to the types of zones previously listed.

Zone grouping generator module 404 is shown to be included in zone grouping generator 302, according to some embodiments. In some embodiments, zone grouping generator module 404 can be configured to generate a plurality of different zone groupings. Each zone grouping may define one or more zone groups and may specify one or more building zones within each zone group. Accordingly, each zone grouping may define a different way in which a plurality of building zones can be organized into zone groups. Examples of two different zone groupings that can be generated for the same set of building zones are described in greater detail with reference to FIGS. 5A and 5B. In some embodiments, zone grouping generator module 404 combines zones into groups of two or more to form a zone group. In some embodiments, zone grouping generator module 404 generates a single zone as a group.

As shown in FIG. 4, zone data collector 406 can be configured to collect data of each zone identified by zone identifier 402. In some embodiments, the collected data includes historical values (e.g., temperature setpoints, energy usage, cost to control environment, etc.). In some embodiments, the collected data includes zone characteristics (e.g., operating modes of zones, relative locations of each zone in a zone group, etc.). In some embodiments, the data collected includes additional data types or any combination of data types.

In some embodiments, zone data collector 406 is configured to continuously collect data and monitor changes in the collected data over a predetermined period of time. For example, zone data collector 406 may continuously collect values of heating loads for one or more zones and monitor changes in the one or more heating loads over a period of a week. In some such embodiments, zone data collector 406 is configured to determine a need to generate a new zone grouping based on changes in zone data and automatically trigger a new zone grouping process to zone grouping generator 302. For example, zone data collector 406 may detect a change in a heating load of a zone over a period of a week and automatically transmit a signal to zone grouping generator 302 to generate a new zone grouping.

Metric of success calculator 408 can be configured to calculate a metric of success value for each zone grouping, which will be described in greater detail below, according to some embodiments. In some embodiments, the metric of success value is calculated based on zone data collected by zone data collector 406. For example, the metric of success value may be calculated based on historical zone temperature, historical temperature setpoints, and historical energy usage. In some embodiments, the metric of success value calculated by metric of success calculator 408 represents an estimated operational success rate of each zone grouping generated by zone grouping generator module 404.

Still referring to FIG. 4, metric of success comparator 410 is shown to compare the metric of success values calculated by metric of success calculator 408, according to some embodiments. In some embodiments, the highest metric of success value is indicative of the highest operational success rate of a zone grouping. In some embodiments, metric of success comparator 410 compares each metric of success value to output the selected zone grouping 304 with the highest metric of success value.

Figure 5A:
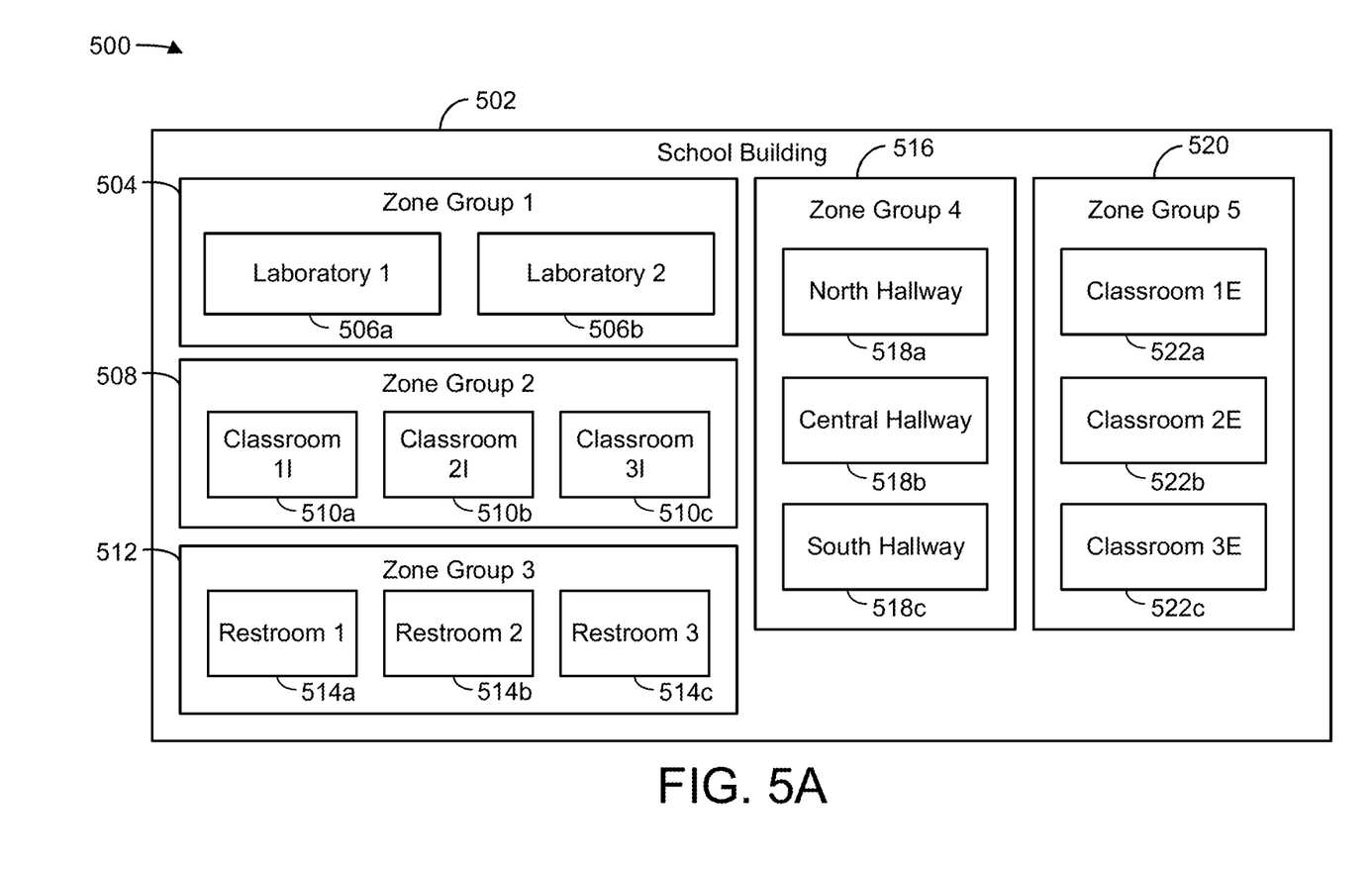
FIG. 5A is a first example of a zone grouping generated by the zone grouping generator of FIG. 4, according to an exemplary embodiment.
Figure 5B:
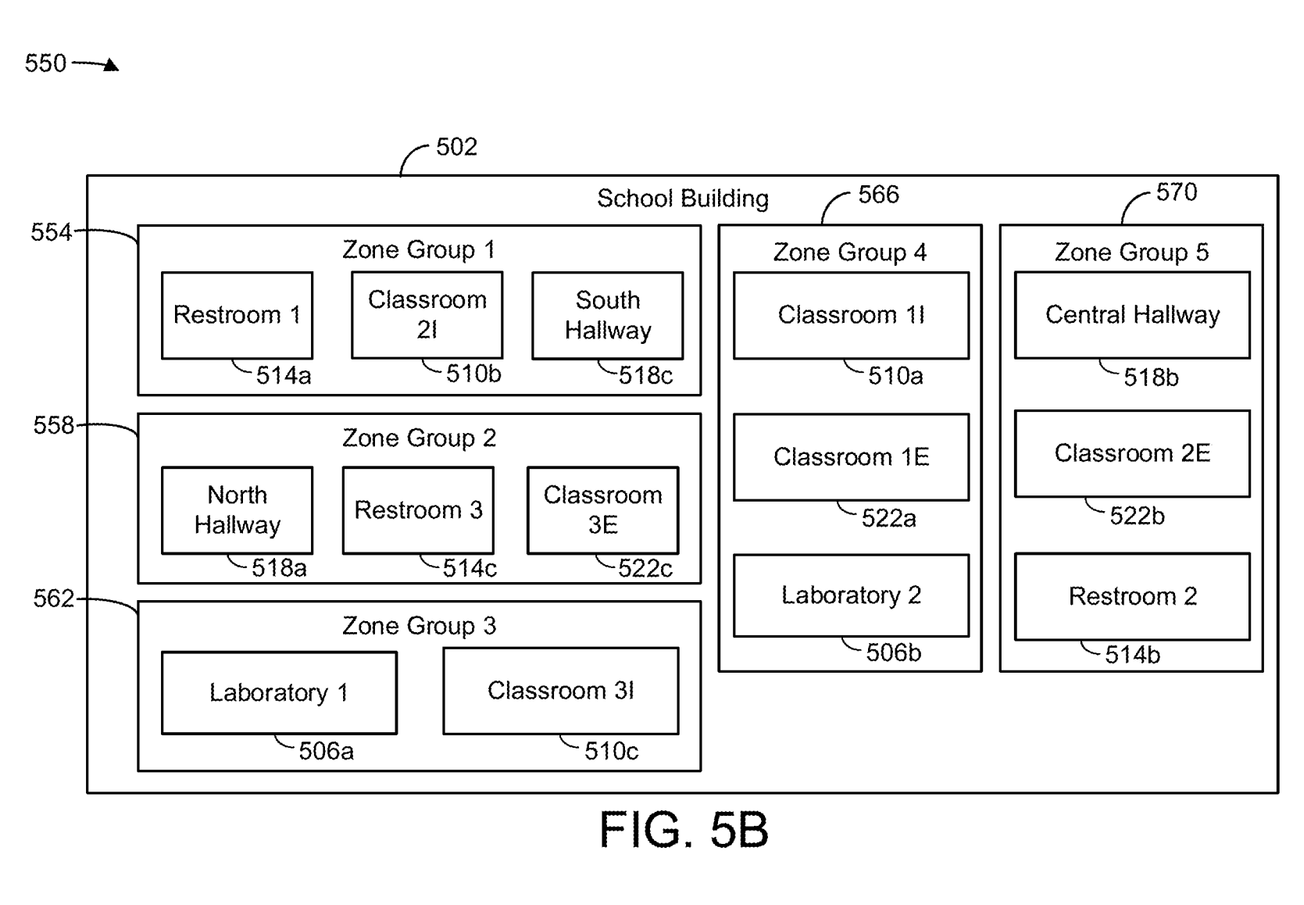
FIG. 5B is a second example of a zone grouping generated by the zone grouping generator of FIG. 4, according to an exemplary embodiment.

Referring now to FIG. 5A and FIG. 5B, examples of various zone groupings are shown, according to some embodiments. FIGS. 5A and 5B are shown to include a structure 502 functioning as a school, according to some embodiments. In some embodiments, structure 502 is shown to include laboratories 506a and 506b (referred to collectively as laboratories 506), interior classrooms 510a, 510b, and 510c (referred to collective as interior classrooms 510), restrooms 514a, 514b, and 514c (referred to collectively as restrooms 514), hallways 518a, 518b, and 518c (referred to collectively as hallways 518), and exterior classrooms 522a, 522b, and 522c (referred to collectively as exterior classrooms 522). In some embodiments, the zones in structure 502 were grouped using zone grouping generator 302. Each of the individual zones in structure 502 were identified using zone identifier 402, according to some embodiments. In some embodiments, zone grouping generator module 404 generated multiple zone groupings. In some embodiments, only two different (e.g., combinations of zone groups) zone groupings were generated by zone grouping generator module 404. In some embodiments, more than two different zone groupings are generated by zone grouping generator module 404.

Referring to specifically to FIG. 5A, a first zone grouping 500 is shown to include a first zone group 504 including laboratories 506, a second zone group 508 including classrooms 510, a third zone group 512 including restrooms 514, a fourth zone group 516 including hallways 518, and a fifth zone group 520 including classrooms 522, according to some embodiments.

Referring specifically to FIG. 5B, a second zone grouping 550 is shown, according to some embodiments. Second zone grouping 550 is shown to include a first zone group 554 including restroom 514a. classroom 510b, and south hallway 518c, a second zone group 558 including north hallway 518a, restroom 514c, and classroom 522c, a third zone group 562 including laboratory 506a and classroom 510c, a fourth zone group 566 including classroom 510a, classroom 522a, and laboratory 506b, and a fifth zone group 570 including central hallway 518b, classroom 522b, and restroom 514b, according to some embodiments.

Following the generation of first zone grouping 500 and second zone grouping 550, zone data is collected for each zone in structure 502 by zone data collector 406, according to some embodiments. A metric of success value is calculated for both first zone grouping 500 and second zone grouping 550 by metric of success calculator 407, according to some embodiments. In some embodiments, the metric of success values for first zone grouping 500 and second zone grouping 550 are compared using metric of success comparator 410. In some embodiments, the zone grouping with the highest metric of success value is determined by metric of success comparator 410 and outputted for use in VRF control. In some embodiments where two or more zone groupings are determined to have equal or similar metric of success values, a user selects which zone grouping is to be used.

Method of VRF Control with Zone Grouping Generation

Figure 6:
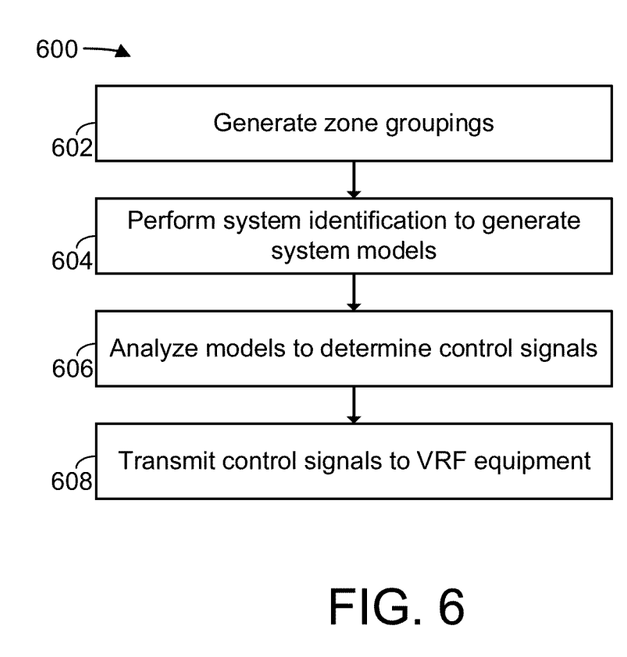
FIG. 6 is flowchart of the general VRF control process including zone grouping generation, according to an exemplary embodiment.

Referring to FIG. 6, a process 600 for generating system models and using the system models to control a variable refrigerant flow system is shown, according to some embodiments. Process 600 begins with step 602, according to some embodiments. Step 602 involves generating zone groupings using zone grouping generator 302, according to some embodiments. At step 602, zone grouping generator 302 is configured to generate a plurality of potential zone groupings, score or rank each of the potential zone groupings, and provide an output of a zone grouping, according to some embodiments. In some embodiments, all of the building zones within a single zone group are treated as a single unit when generating a system model and control signals. For example, a different system model may be generated for each zone group (using data from all of the zones in that zone group) and the system model for a zone group may be used to generate control signals for all of the zones in that zone group. In some embodiments, step 602 involves outputting best zone groupings. The method of generating zone groupings will be described in greater below.

Process 600 continues with step 604, according to some embodiments. Step 604 involves performing system identification to generate system models of the zone groups generated in step 602 using system identification module 306, according to some embodiments. At step 604, system identification module 306 is configured to perform a system identification process to generate system models of each zone group generated in step 602, according to some embodiments. In some embodiments, system identification module 306 obtains training data (e.g., input data and output data) associated with the building zones in the first group and uses the training data to train a system model for the first zone group. In some embodiments, system identification module 306 repeats this process for each of the zone groups in a zone grouping to generate a different system model for each zone group. In some embodiments, system identification module 306 is configured to perform a system identification process for each of the zone groups in the zone grouping generated by zone grouping generator 302 in step 602.

Process 600 continues with step 606, according to some embodiments. In some embodiments, step 606 includes using the models generated in 604 to generate control signals for VRF equipment using control signal generator 310. At step 606, control signal generator 310 is configured to receive one or more system models generated by system identification module 306 in step 604, according to some embodiments. In some embodiments, control signal generator 310 uses system models generated by system identification module 306 in step 604 to generate appropriate control signals for VRF equipment 314 that operate to control an environment of one or more zone groups. In some embodiments, control signal generator 310 uses any of a variety of model-based control methodologies (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to generate a control signal in step 606.

Process 600 is shown to continue with step 608, according to some embodiments. Step 608 includes transmitting the control signals generated by control signal generator 310 in step 606 to various VRF equipment, according to some embodiments. In some embodiments, the generated control signals are transmitted to various indoor VRF units located within a particular zone or zone group configured to control one or more environmental variables (e.g., temperature, humidity, etc.) of one or more zones in a particular zone group. In some embodiments, the generated control signals are transmitted to various outdoor VRF units configured to provide refrigerant to various indoor VRF units located within a particular zone or zone group.

Method of Zone Grouping Generation

Figure 7:
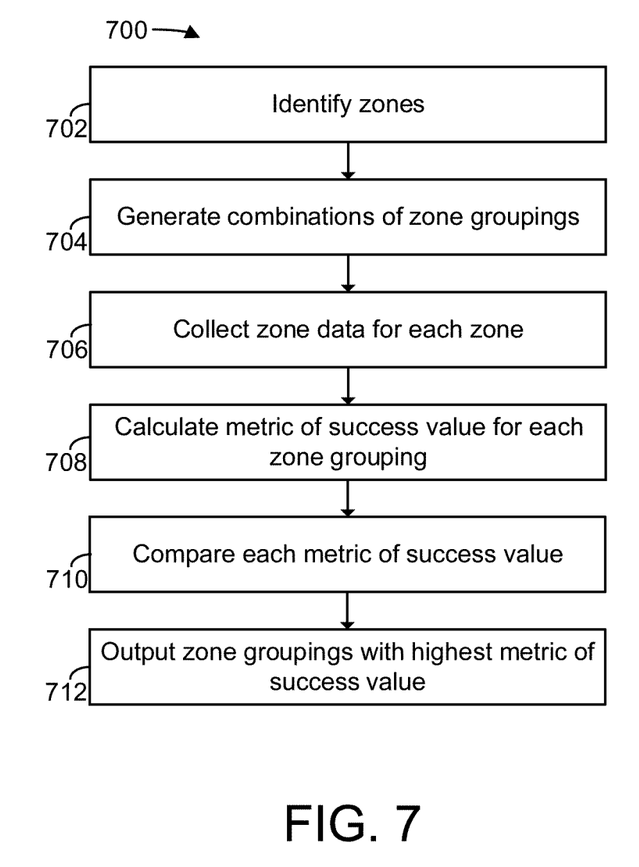
FIG. 7 is a flowchart of the zone grouping generation process implemented in the VRF control process of FIG. 6, according to an exemplary embodiment.

Referring now to FIG. 7, a process 700 for generating and evaluating the metric of success values of various zone groupings is shown, according to some embodiments. Process 700 begins with step 702, according to some embodiments. At step 702, zone identifier 402 is configured to identify the types of zones in a building, according to some embodiments. For example, step 702 may involve zone identifier 402 identifying the types of zones in a structure that functions as a school. In some embodiments, the types of zones in a school includes classrooms, laboratories, restrooms, and hallways. Additional types of zones may be identified and are not limited to the types of zones previously listed.

Process 700 continues with step 704, according to some embodiments. In some embodiments, step 704 includes zone grouping generator module 404 generating a plurality of different zone groupings. In some embodiments, each zone grouping defines one or more zone groups and specifies one or more building zones within each zone group. Accordingly, in some embodiments, each zone grouping defines a different way in which a plurality of building zones can be organized into zone groups. In some embodiments, the generated zone groupings include the zones identified in step 702, arranged into various zone groups. In some embodiments, step 704 includes combining zones into groups of two or more. In some embodiments, step 704 includes generating a single zone as a group.

Still referring to FIG. 7, process 700 is shown to continue with step 706, according to some embodiments. In some embodiments, step 706 includes zone data collector 406 collecting zone data of each zone identified by zone identifier 402. In some embodiments, the collected data includes historical values (e.g., temperature setpoints, energy usage, cost to control environment, etc.). In some embodiments, the collected data includes zone characteristics (e.g., operating modes of zones, relative locations of each zone in a zone group, etc.). In some embodiments, the data collected includes additional data types or any combination of data types.

In some embodiments, step 706 involves zone data collector 406 continuously collecting data and monitoring changes in the collected data over a predetermined period of time. In some such embodiments, step 706 involves zone data collector 406 determining a need to generate a new zone grouping based on changes in zone data and automatically triggering a new zone grouping process to zone grouping generator 302. For example, if zone data collector 404 receives indoor air temperature data containing values outside a predetermined range of acceptable indoor air temperature values for a particular zone in a zone group, then zone data collector 404 may transmit a signal to zone grouping generator 302 to run a new zone grouping process.

Process 700 is shown to continue with step 708, according to some embodiments. As will be described in greater detail below with reference to FIGS. 8 & 9, in some embodiments, step 708 involves calculating a metric of success value for each zone grouping generated in step 704. In some embodiments, calculating the metric of success value includes using zone data collected in step 706. In some embodiments, the metric of success value calculated in step 708 represents an operational success rate of each zone grouping generated in step 704.

Still referring to FIG. 7, process 700 is shown to continue with step 710, according to some embodiments. In some embodiments, step 710 includes comparing the metric of success values calculated in step 708 as will described with reference to FIGS. 8 & 9. In some embodiments, metric of success comparator 410 compares each metric of success value calculated in step 708 to identify the zone grouping with the greatest metric of success value. In some embodiments, the greatest metric of success value is indicative of the greatest operational success rate of the particular zone grouping associated with said greatest metric of success value.

Process 700 is shown to continue with step 712, according to some embodiments. In some embodiments, step 712 involves metric of success comparator 410 outputting one or more zone groupings with the highest metric of success value. In some embodiments, step 712 involves outputting zone groupings including two or more zones. In some embodiments, step 712 involves outputting zone groupings including a single zone. In some embodiments, step 712 further involves a user selecting a particular zone grouping outputted by metric of success comparator 410. The outputted zone grouping (or a user-selected zone grouping) is used by system identification module 306 to perform system identification (e.g., step 604 with reference to process 600 illustrated in FIG. 6) to proceed with controlling a variable refrigerant flow system, according to some embodiments.

Figure 8:
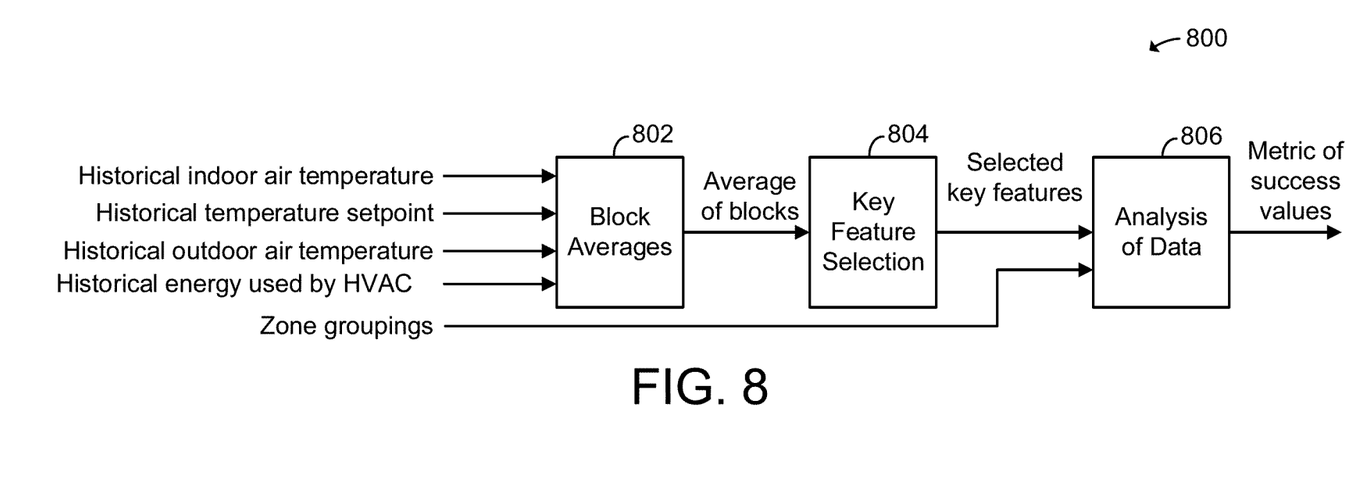
FIG. 8 is a flowchart illustrating a first metric of success calculation process implemented in the zone grouping generation process of FIG. 7, according to an exemplary embodiment.
Figure 9:
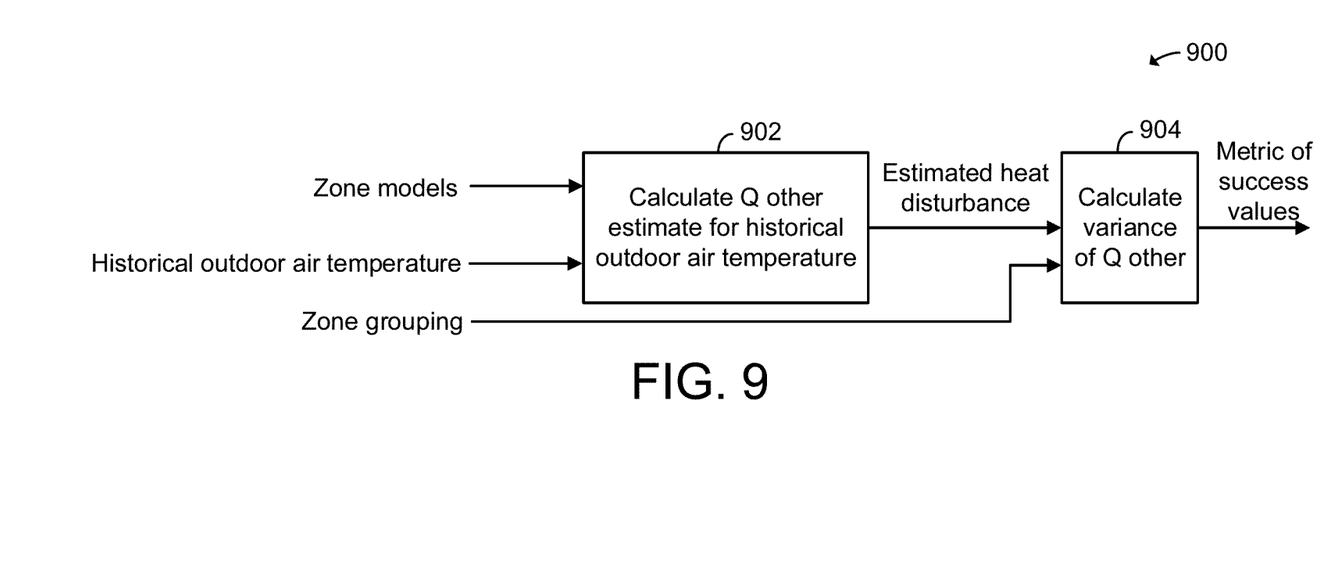
FIG. 9 is a flowchart illustrating a second metric of success calculation process implemented in the zone grouping generation process of FIG. 7, according to an exemplary embodiment.

Referring generally to FIGS. 8 & 9, various processes of calculating the metric of success value for a zone grouping are shown, according to some embodiments. Referring specifically to FIG. 8, a process of calculating a metric of success value using raw data 800 is shown, according to some embodiments. In some embodiments, process 800 uses raw data (e.g., historic temperature setpoints, historic indoor air temperature, etc.) collected over a period of time (e.g., days, weeks, months, etc.). In some embodiments, the raw data used in process 800 is zone data collected by zone data collector 406 in step 706 of process 700. In some embodiments, process 800 involves metric of success calculator 408 calculating the metric of success value.

In order to calculate the metric of success value using raw data, each different type of zone data (e.g., historical indoor air temperature, historical temperature setpoint, historical outdoor air temperature, etc.) collected by zone data collector 406 over a predetermined time period is blocked together into a different zone data block for each different type of zone data to calculate an average for each different zone data type over the predetermined time period for each zone identified by zone identifier 402 in step 802, according to some embodiments. For example, values of weekly temperature setpoints for a particular zone may be blocked together to generate 52 values of weekly temperature setpoints for that particular zone (e.g., one weekly temperature setpoint for each week in a year). In another example, values of monthly temperature setpoints for a particular zone may be blocked together to generate 12 values of monthly temperature setpoints (e.g., one monthly temperature setpoint for each week in a year).

Step 802 is shown to calculate, for each zone, the average of blocks of zone data including historical indoor air temperature, historical temperature setpoint, historical outdoor air temperature, and historical energy used by HVAC devices and output the average of each block, according to some embodiments. In some embodiments, metric of success calculator 408 calculates the average of each block in step 802. It should be understood that the historical data used in process 800 is intended to be exemplary and not limiting. Any appropriate zone data may be used in process 800, according to some embodiments. The following equation may be used to calculate the average of a block of a particular zone data:

$$\overline{D}(t) = \frac{1}{t}\sum_{t=1}^{n} D(t)$$

In the previous equation, D(t) represents data points of a particular zone data type (e.g., historical indoor air temperature, historical temperature setpoint, etc.) that are collected over a predetermined time period, t is the number of particular data points included in the predetermined time period, and $\overline{D}(t)$ is the average of the block of a particular zone data over the predetermined time period t.

The previous equation may be used to calculate the average for any raw zone data intended for use in calculating the metric of success value, according to some embodiments. For example, the previous equation may be used to calculate the average of historical indoor air temperature.

The average of each block generated in step 802 is shown as an input to step 804, according to some embodiments. In step 804, key features are selected for use in outlier detection techniques as will be described below, according to some embodiments. Selected key features may include one or more block averages calculated in step 802 and/or further computations using the various block averages calculated in step 802. For example, a selected key feature in step 804 may include subtracting the average historical temperature setpoint calculated in step 802 from the average historical indoor air temperature calculated in step 802 in order to calculate a difference between the average historical temperature setpoint and the average historical air temperature. Another example may include collecting the block average of energy used by HVAC devices to operate the HVAC devices based on average historical temperature setpoints in one or more zones. In some embodiments, the key features selected in step 804 are selected by a user. In some embodiments, the key features selected in step 804 are automatically selected (e.g., by zone grouping generator 302). In some embodiments, the process of selecting key features is repeated for each zone identified by zone identifier 402.

Step 804 is shown to output the selected key features for use in step 806, according to some embodiments. Step 806 is also shown to receive zone groupings (as identified by zone grouping generator module 404) as an input, according to some embodiments. In step 806, the data included in the selected key features are analyzed using one or more outlier detection techniques in order to determine one or more outlying zones in a particular zone group, according to some embodiments. In some embodiments, the zone groupings include all combinations of possible zone groupings as generated by zone grouping generator module 404.

For each zone group, one or more outlier detection techniques are applied to the data associated in the selected key features for each zone included in a particular zone group in order to determine one or more outlier zones included in the particular zone group, according to some embodiments. Some commonly-known techniques of outlier detection for use in step 806 may include DBCAN, isolation forest, and Z-Score. In general, outlier detection is a method of analyzing a pool of data to determine one or more outlying data points relative to the majority of the data. In some embodiments, outlier detection determines, by analyzing a particular selected key feature, one or more zones that are outliers relative to the other zones in a particular zone group. For example, a process of outlier detection applied to analyze the historical temperature setpoints of each zone in a particular zone group including four individual zones may determine that one of the four zones has a substantially different (e.g., a higher temperature setpoint or a lower temperature setpoint) temperature setpoint than the other three zones included in that particular zone group. In some such embodiments, the one or more outliers determined by outlier detection are identified as undesirable for a particular zone group.

In some embodiments, the process of outlier detection, by analyzing a particular selected key feature, does not determine any outlier zones. In some such embodiments, the zone group is identified as a substantially successful zone group. For example, a process of outlier detection applied to analyze the historical temperature setpoints of each zone in a particular zone group including four individual zones may not identify any outlying zones and, as a result, identifies that particular zone group as a substantially successful zone group. In some embodiments, a process of outlier detection is applied to each selected key feature of step 804. In some embodiments, a particular zone group is omitted if all zones in the particular zone group are identified as outliers. For example, a process of outlier detection applied to analyze the historical temperature setpoints of each zone in a particular zone group including four individual zones may identify all four zones as outliers and, as a result, omits that particular zone group from further processing. As should be understood, additional outlier detection techniques not explicitly stated herein may be used, according to some embodiments.

In some embodiments, step 806 further involves identifying historical operating modes with numeric values for each zone in a zone group for use in one or more outlier detection techniques. For example, a historical cooling mode may be identified with a value of −1, a historical non-operating mode may be identified with a value of 0, and a historical heating mode may be identified with a value of 1. In some embodiments, each zone in a zone group is assigned a value associated to a historical operating mode used by each zone and compared using one or more outlier detection techniques. In some embodiments, each zone in a zone group is assigned a value associated to a historical operating mode based on a majority operating mode over a predetermined time period and compared using one or more outlier detection techniques. For example, a zone may be identified with a value of −1 for operating in a cooling mode for 4 days over a week long data collection period. In another example, a zone may be identified with a value of 1 for operating in a heating mode for 13 hours over a day long data collection period.

Further, in some embodiments, step 806 involves identifying a location for each zone in a zone group for use in one or more outlier detection technique. In some such embodiments, a floorplan of a building including the zones for use in process 800 is converted to grid coordinates to determine numeric location values based on the grid coordinates. Each numeric location value is used in one or more outlier detection techniques as previously stated to compare relative locations of each zone in a zone group, according to some embodiments.

The number of detected outlying zones in a particular zone group are used to calculate the metric of success value for the particular zone group, according to some embodiments. The metric of success value may be calculated using the following equation:

$$P_{success} = \frac{n - N_{outliers}}{n}$$

In the previous equation, $P_{success}$ is the metric of success value for a particular zone group, n is the total number of zones in a particular zone group, and $N_{outliers}$ is the number of outlying zones in a particular zone group as determined by the outlier detection technique.

Step 806 involves metric of success calculator 408 calculating a metric of success value for each zone group generated by zone grouping generator module 404, according to some embodiments. Further, in some embodiments, step 806 involves outputting each metric of success value to metric of success comparator 410 for use in determining the best zone grouping.

Referring now to FIG. 9, a process of calculating a metric of success value using zone models 900 is shown, according to some embodiments. Process 900 is configured to use zone models of heat load disturbances to estimate variances in heat load disturbances of one or more zones based on historical weather data (e.g., historical outdoor air temperature), according to some embodiments. Possible implementations of generating zone models and collecting historical weather data are described in U.S. patent application Ser. No. 15/473,496 filed Mar. 29, 2017, incorporated by reference herein in its entirety.

Process 900 is shown to begin with step 902, according to some embodiments. In some embodiments, step 902 involves metric of success calculator 408 using one or more zone models based on outdoor air temperature and relative humidity of the outdoor air to estimate the heat load disturbance of one or more zones. The heat load disturbance is estimated according to the equation below:

$$Q_{other,i} = f(T_{oa}, RH)$$

In the previous equation, $Q_{other,i}$ represents the estimated heat disturbance of a particular zone i, $T_{oa}$ represents the historical outdoor air temperature based on one or more zone models, and RH represents the relative humidity of the outdoor air based on one or more zone models.

In some embodiments, $Q_{other,i}$ further includes factors such as heat generated from devices (e.g., computers, lighting components, etc.), sunlight entering a zone, or historical occupancy data. The estimated heat disturbance calculated for each zone in step 902 is shown as an input for use in step 904, according to some embodiments. In some embodiments, step 904 involves calculating the variance in heat disturbance for one or more zones included in each zone group generated by zone grouping generator module 404. In some embodiments, step 904 begins by calculating the mean of heat disturbance for each zone in a particular zone group using the following equation:

$$\mu_k(t) = \frac{1}{n} \sum_{i=1}^{n} Q_{other,i}(t)$$

In the previous equation, $\mu_k(t)$ is the mean of the estimated heat disturbance of a zone group k over a time period t, n is the number of zones in zone group k, and $Q_{other,i}(t)$ is the estimated heat disturbance for zone i over time period t.

In some embodiments, the mean of the estimated heat disturbance is used to calculate the variance of heat disturbance using the following equation:

$$var_k(t) = \frac{1}{n} \sum_{i=1}^{n} (Q_{other,i}(t) - \mu_k(t))^2$$

In the previous equation, $var_k(t)$ is the variance in estimated heat disturbance for a zone group k over a time period t, n is the number of zones in zone group k, $Q_{other,i}(t)$ is the estimated heat disturbance for zone i over time period t, and $\mu_k(t)$ is the mean of the estimated heat disturbance of zone group k over time period t.

In some embodiments, the variance for each zone group k is used to calculate the average variance of heat disturbance for a zone grouping using the following equation:

$$\overline{var} = \frac{1}{T} \sum_{k=1}^{T} var_k(t)$$

In the previous equation, $\overline{var}$ is the average variance in heat disturbance for a zone grouping, T is the number of zone groups in a particular zone grouping, and $var_k(t)$ is the variance in estimated heat disturbance for a zone group k over a time period t.

In some embodiments, the average variance in heat disturbance for a zone grouping is used to calculate the metric of success value in the following equation:

$$P_{success} = f\left(\frac{1}{\overline{var}}\right)$$

In the previous equation, $P_{success}$ is the metric of success value and $\overline{var}$ is the average variance in heat disturbance for a zone grouping.

Step 904 involves metric of success calculator 408 calculating a metric of success value for each zone grouping identified by zone grouping generator module 404, according to some embodiments. Further, in some embodiments, step 904 involves outputting each metric of success value to metric of success comparator 410 for use in determining the best zone grouping.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for a variable refrigerant flow system, the controller comprising one or more processors and memory storing instructions that, when executed by the one or more processors, cause the one or more processors to perform operations comprising:
   identifying a plurality of zones within a structure;
   generating a plurality of zone groupings, each of the plurality of zone groupings defining a plurality of zone groups and specifying which of the plurality of zones are grouped together to form each of the plurality of zone groups;
   generating a plurality of metric of success values, each metric of success value corresponding to a particular zone grouping of the plurality of zone groupings and indicating a control feasibility of a corresponding zone grouping, wherein generating the plurality of metric of success values comprises using zone models for the plurality of zones to determine thermal characteristics of the plurality of zones and calculating a variance for each zone group of the plurality of zone groups based on the thermal characteristics of the plurality of zones grouped together to form the zone group;
   selecting a zone grouping of the plurality of zone groupings based on the plurality of metric of success values; and
   using the selected zone grouping to operate equipment of the variable refrigerant flow system to provide heating or cooling to the plurality of zones.

2. The controller of claim 1, wherein the one or more processors are further configured to analyze data associated with the one or more zone groupings of various combinations, the data comprising at least one of:
   one or more historical zone temperature set points of the one or more zones in the one or more zone groupings;
   one or more historical zone operating modes of the one or more zones in the one or more zone groupings; and
   one or more zone locations of the one or more zones in the one or more zone groupings.

3. The controller of claim 1, wherein the plurality of zones comprises at least one device configured to control an environment of one or more of the plurality of zones of the selected zone grouping.

4. The controller of claim 1, wherein the controller further comprises a system identification module configured to generate at least one system model based on an output comprising the selected zone grouping.

5. The controller of claim 1, the operations further comprising generating one zone grouping that is the particular zone grouping defining a plurality of zone groups and specifying which of the plurality of zones are grouped together to form each of the plurality of zone groups.

6. The controller of claim 1, wherein the thermal characteristics of the plurality of zones comprise heat disturbance values, the variance comprises a heat variance value, and generating the plurality of metric of success values further comprises:
   receiving the zone models for the plurality of zones, wherein each zone model corresponds to a particular zone in the particular zone group;
   calculating a heat disturbance value for each zone in the particular zone group using the zone model that corresponds to each zone;
   calculating the heat variance value for the particular zone group using the heat disturbance value for each zone; and
   calculating a metric of success value for the particular zone group.

7. The controller of claim 1, wherein the thermal characteristics of the plurality of zones comprise estimated heat disturbance loads and generating the plurality of metric of success values further comprises:
   calculating the estimated heat disturbance loads based on an outdoor air temperature and an outdoor air relative humidity value; and
   calculating the variance in the estimated heat disturbance loads.

8. The controller of claim 1, wherein generating the plurality of metric of success values further comprises calculating an operating cost value for one or more of the zone groupings based on data associated with at least one device configured to control an environment of one or more of the plurality of zones.

9. A controller for a variable refrigerant flow system configured to operate equipment of the variable refrigerant flow system, the controller comprising:
a zone identifier configured to identify a plurality of zones within a structure;
a zone grouping generator module configured to generate a plurality of zone groupings, each of the plurality of zone groupings defining a plurality of zone groups and specifying which of the plurality of zones identified by the zone identifier are grouped together to form each of the plurality of zone groups;
a metric of success calculator configured to generate a plurality of metric of success values, each metric of success value corresponding to a particular zone grouping of the plurality of zone groupings generated by the zone grouping generator module and indicating a control feasibility of a corresponding zone grouping, wherein generating the plurality of metric of success values comprises using zone data for the plurality of zones to identify a number of outlier zones in each zone group of the plurality of zone groups and calculating a metric of success value for each zone group based on the number of outlier zones in the zone group;
a metric of success comparator configured to determine a selected zone grouping of the plurality of zone groupings based on the plurality of metric of success values generated by the metric of success calculator; and
a control signal generator configured to use the selected zone grouping determined by the metric of success comparator to generate one or more control signals to operate equipment of the variable refrigerant flow system to provide heating or cooling to the plurality of zones.

10. The controller of claim 9, wherein the plurality of zones comprises at least one device configured to control an environment of one or more of the plurality of zones of the selected zone grouping.

11. The controller of claim 9, wherein the controller further comprises a system identification module configured to generate at least one system model based on an output comprising the selected zone grouping.

12. The controller of claim 9, wherein the metric of success value calculator is further configured to:
perform one or more outlier detection techniques to identify the number of outlier zones in each zone group; and
calculate the metric of success value for each zone group using the number of outlier zones in the zone group and a total number of zones in the zone group.

13. The controller of claim 9, wherein the metric of success value calculator is further configured to:
calculate one or more estimated heat disturbance loads based on an outdoor air temperature and an outdoor air relative humidity value; and
calculate one or more variances in the one or more estimated heat disturbance loads.

14. The controller of claim 9, wherein the metric of success calculator is further configured to calculate an operating cost value for one or more of the zone groupings based on data associated with at least one device configured to control environment of one or more of the plurality of zones.

15. A method for operating equipment of a variable refrigerant flow system to provide heating or cooling to a plurality of zones, the method comprising:
identifying the plurality of zones within a structure;
generating a plurality of zone groupings, each of the plurality of zone groupings defining a plurality of zone groups and specifying which of the plurality of zones are grouped together to form each of the plurality of zone groups;
generating a plurality of metric of success values, each metric of success value corresponding to a particular zone grouping of the plurality of zone groupings and indicating a control feasibility of a corresponding zone grouping, wherein generating the plurality of metric of success values comprises using zone models for the plurality of zones to determine thermal characteristics of the plurality of zones and calculating a variance for each zone group of the plurality of zone groups based on the thermal characteristics of the plurality of zones grouped together to form the zone group;
selecting a zone grouping of the plurality of zone groupings based on the plurality of metric of success values; and
using the selected zone grouping to generate one or more control signals, the one or more control signals configured to operate equipment of the variable refrigerant flow system to provide heating or cooling to the plurality of zones.

16. The method of claim 15, wherein using the selected zone grouping to generate the one or more control signals further comprises performing system identification to generate at least one system model based on the selected zone grouping.

17. The method of claim 15 further comprising generating one zone grouping that is the particular zone grouping defining a plurality of zone groups and specifying which of the plurality of zones are grouped together to form each of the plurality of zone groups.

18. The method of claim 15, wherein generating the plurality of metric of success values further comprises:
performing one or more outlier detection techniques to identify a number of outlier zones in each zone group; and
calculating the metric of success value for each zone group using the number of outlier zones in the zone group and a total number of zones in the zone group.

19. The method of claim 15, wherein generating the plurality of metric of success values further comprises:
calculating one or more estimated heat disturbance loads based on an outdoor air temperature and an outdoor air relative humidity value; and
calculating one or more variances in the one or more estimated heat disturbance loads.

20. The method of claim 15, wherein generating the plurality of metric of success values further comprises calculating an operating cost value associated with one or more combinations of zone groupings based on data associated with at least one device configured to control an environment of one or more of the plurality of zones.

* * * * *